United States Patent [19]

Casimir et al.

[11] Patent Number: 4,740,019
[45] Date of Patent: Apr. 26, 1988

[54] PIPE ADAPTER

[76] Inventors: Frank Casimir, Adenauer Allee 201, 5100 Aachen, Fed. Rep. of Germany; Manfred Quint, Ehrenstr. 1 B, 5110 Alsdorf, Fed. Rep. of Germany

[21] Appl. No.: 929,915

[22] Filed: Nov. 13, 1986

[30] Foreign Application Priority Data

Nov. 19, 1985 [DE] Fed. Rep. of Germany ....... 3540981
Oct. 29, 1986 [DE] Fed. Rep. of Germany ....... 3636773

[51] Int. Cl.⁴ .............................................. F16L 19/08
[52] U.S. Cl. .................................. 285/341; 285/382.7
[58] Field of Search ..................... 285/341, 382.7, 342, 285/343

[56] References Cited

U.S. PATENT DOCUMENTS

| | | | |
|---|---|---|---|
| 2,472,872 | 6/1949 | Woodling | 285/341 |
| 2,641,487 | 6/1953 | LaMarre | 285/341 |
| 4,309,050 | 1/1982 | Legris | 285/382.7 X |
| 4,630,851 | 12/1986 | Ogawa | 285/341 |

FOREIGN PATENT DOCUMENTS

| | | | |
|---|---|---|---|
| 7651 | 1/1968 | Australia | 285/382.7 |
| 1450382 | 4/1973 | Fed. Rep. of Germany | |
| 6505123 | 1/1966 | Netherlands | 285/341 |
| 1362205 | 7/1974 | United Kingdom | 285/341 |
| 346538 | 7/1972 | U.S.S.R. | 285/341 |

Primary Examiner—Thomas F. Callaghan
Attorney, Agent, or Firm—Gilbert L. Wells

[57] ABSTRACT

The invention concerns a pipe adapter with an insertion stub for the pipe end to be connected, said stub including an inner cone receiving a correspondingly shaped outer cone at one end (press end) of a sealing bush slipped on the pipe end, the other end (cutting end) of this bush comprising another outer cone spanned by the correspondingly shaped inner cone of a clamping ring and at least one circumferential cutting edge at the inside of the sealing bush and directed toward the outer wall of the pipe end, whereas the inner surface of the outer cone of the press end is cylindrical, the cone angle of the cutting end being larger than that of the press end, and this adapter shall be designed in such a manner that it will be easily assembled, shall offer reliable sealing and furthermore shall be corrosion-resistant.

To that end the invention provides that the cone angle of the cutting end is about 70° to 140° and that the segment of the sealing bush between the press end and the cutting end is of lesser wall thickness than the adjacent segments and forms an axially acting spring.

15 Claims, 5 Drawing Sheets

PIPE ADAPTER

BACKGROUND OF THE INVENTION

The invention concerns a pipe adapter, with an insertion stub for the pipe end to be connected and provided with an inner cone to receive a correspondingly shaped outer cone at one end (press end) of a sealing bush slipped on the pipe end, the other end (cutting end) of this bush being provided with a further outer cone which is overlapped by the correspondingly shaped inner cone of a clamping ring and with at least one cutting edge on the inside of the sealing bush and running circumferentially against the outer wall of the pipe end, while the inside of the outer cone of the press end is cylindrical, the cone angle of the cutting end being larger than that of the press end.

In a known system of this type as disclosed in West German published application No. 30 25 292 or British patent No. 20 54 078, both corresponding to U.S. Pat. No. 4,309,050, the sealing bush consists of two parts, the press end being a somewhat softer material which plastically deforms under high pressure.

This system suffers from the drawback that such deforming materials lack elastic properties, whereby sealing cannot be assured permanently. Moreover the relative small cone angle of the cutting end prevents substantial axial forces from being applied to the press end for the purpose of achieving adequate sealing that would result from the consequent higher compression. This feature is aggravated in the known system of Legris because the sealing bush is provided with a stop surface extending in a plane perpendicular to the pipe axis and therefore rests against a corresponding surface of the insertion stub and hence prevents substantial compressive forces from being applied.

Lastly the known system incurs the drawback that an additional component is required for sealing, entailing thereby higher expenditures both in manufacture and assembly.

Pipe adapters are known from West German published application No. 14 50 382 where the press end and the cutting end of the sealing bush are combined by the inwardly pointing cutting edges located on the inside of the press end.

However it has been ascertained that both designs are unsuitable for pipe systems moving corrosive media, for instance acid gases containing $H_2S$, because in spite of the use of corrosion-resistant materials for the piping, both the pipe material and the sleeve material will corrode due to the reactivity of the medium, because the zone of maximum stress concentration, that is especially the cutting surfaces and the surface in the pipe material associated with them are located in the area of maximum exposure to the corrosive medium, resulting in stress crack corrosion and therefore leakage. The known design entails a further drawback for the cited application in that the sealing bushes are gas-nitrided at least in the vicinity of the cutting edges to achieve adequate surface hardness, whereby they lose at their surface their originally corrosion-resistant properties. Because such pipe adapters perforce will leak after some time in operation in the cited applications, the moved corrosive media, for instance acid gases, being damaging to health when not downright poisonous, pipe adapters of the known types must be constantly checked for tightness if they are used at all in such applications.

SUMMARY OF THE INVENTION

Accordingly it is the object of this invention to create a pipe adapter of the initially cited type, which can be assembled in simple manner, which provides reliable sealing and furthermore is corrosion-resistant.

The invention solves this problem in that the cone angle of the cutting end is about 70° to 140° and in that the segment of the sealing bush between the press end and the cutting end is of a lesser wall thickness than the adjacent segment and forms an axial spring.

By means of this design it is possible to substantially only exert axial forces on the sealing bush when tightening the clamping ring designed as a coupling nut on account of the relatively large cone angle of the cutting end, whereby these axial forces tightly force the press end into the cone of the insertion stub. Only after the rest force opposing this thrust has become so great that adequate sealing is assured will the cutting end of the bush elastically deform toward the outside of the pipe, the segment of lesser wall thickness making possible and favoring the sloping of the cutting end pointing toward the pipe. As this deformation takes place within the elastic range, a spring force is thereby simultaneously applied to the press end, whereby this press end is kept elastically in the sealing state when changes in dimensions take place, especially as due to temperature fluctuations.

Moreover, cutting by the sealing bush into the press area is prevented, whereby deformations exceeding the elastic range of the pipe material cannot occur.

As the sealing takes place in the area of the press end, the cutting edge and its high loads on the pipe material and bush material are away from any contact possibility with possibly corrosive media flowing through the pipe system, and nevertheless the cutting edge on the one hand and on the other the conical end face of the sealing bush resting against the clamping ring acts as an additional seal, so that both possible leakage paths between the pipe outside and the sealing-bush inside on the one hand and on the other between the sealing-bush outside and the stub clamping ring are doubly sealed.

Advantageously the cone angle of the end face of the cutting end is approximately 90°. This assures that the axial force exerted by the clamping ring already applies a high sealing force in the vicinity of the press end before, by further clamping, the cutting edges are pressed into the pipe material.

Advantageously too the cone angle of the press end is about 24° as thereby the axial force exerted by the clamping ring on the sealing bush is converted into high compression in the area of the press end of the sealing bush.

To facilitate assembly and also to prevent damaging the connection by excessively tightening the clamping ring, appropriately at least one stop surface is present on the inside of the cutting end next to the cutting edges or between them and rests therefore on the outside of the pipe end. In this manner the depth of penetration of the cutting end into the outer pipe surface is limited.

In this respect it may be advantageous to provide a stop surface on both sides of and next to the cutting edges.

A suitable embodiment of the invention provides that the edge of the press end facing the pipe outer surface be rounded off. As a result a peak stress is reliably averted in the adapter area exposed to the medium.

An appropriate embodiment of the invention further calls for the length of the cylindrical inside of the press end being about ⅔ the length of the conical outside. As a result, when the clamping ring exerts the axial force, a uniform radial deformation of the press end is made possible by a reduction of the inside diameter of the bush sleeve in this region and hence also a uniform rest of the cylindrical inside surface on the pipe outside surface. Appropriately the inside diameter of the cylindrical inside surface exceeds by about 0.4% the outside diameter of the pipe end to be connected.

Because drawn, seamless high-accuracy pipe-stubs and ground sealing bushes must be used for such pipe adapters, it is still just possible when observing the stated tolerances to manually slip the sealing bush on the pipe and, after the pipe end has been placed into the insert stub, to move this bush into the conical opening of the insertion stub. If the pipe outer diameter is illustratively 12 mm, there will be an oversize of 0.05 mm for the inside diameter of the cylindrical part of the sealing bush.

A preferred embodiment of the invention further provides that the cutting edge comprises a cutting surface slanting toward the press end and subtending an angle between 15° and 25°, preferably less than 20° with the plane of the diameter, further a free surface slanting toward the other end subtending an angle from 12° to 20°, preferably 15° with the longitudinal axis of the sealing sleeve. Such a "cutting geometry" is optimally matched to the cutting properties of the corrosion-resistant pipe materials considered herein, in particular high-alloy, austenitic high-grade steels such as pipe material 1.4571. Because of this cutting geometry, the tightening of the clamping ring causes problem-free forcing of the cutting edge into the pipe material while simultaneously a closed sealing bead is raised. When at least two cutting edges are mounted behind each other, the pipe material enters the gap between the first and the second edges and fills it practically completely and in sealing manner.

The inside diameter of the sealing bush at the cutting edge appropriately is about 1.6% greater than the outside diameter of the inserted pipe. As a result, when the clamping ring is tightened, first the press end is reliably and adequately pressed into the conical opening of the insertion stub before the cutting edges are forced by elastic deformation of the center area acting as a spring into the pipe material. When two cutting edges are mounted one behind the other, the depth of the circumferential groove limited by the two cutting edges is about 25% of the distance between the two cutting edges.

In a preferred embodiment of the invention, the inside surface of the sealing bush assumes a cross-sectionally arcuate contour between the press end and the cutting edge. Appropriately the distance between the apex area of this contour and the adjoining press end is greater than to the adjoining cutting edge. As a result, when the clamping ring exerts its axial force, that center region acting as a spring can bulge outward in specific manner, the special position of the apex segment assuring that this bulging can only become effective some distance away from the contact area between the press end and the conical opening of the insertion stub, whereby the conical part of the press end can be further "slipped on" in seal-enhancing manner by means of the axial spring effect also when in the assembled position.

Appropriately at least the sealing bush will be made of an austenitic high-grade steel harder than the pipe material. This allows better penetration of the cutting edges into the pipe material.

While it is possible basically to gas-nitride the surface of the sealing sleeve because of its geometry, it was found especially advantageous on the other hand to increase the surface hardness by surface coating with titanium nitrite. Thereby both the resistances to wear and to corrosion are increased while the friction is reduced, and accordingly a pipe adapter of the design of the invention can be removed and re-used, ie without a need for changing it.

BRIEF DESCRIPTION OF THE DRAWINGS

The invention is discussed below in relation to schematic drawings on a much enlarged scale.

DESCRIPTION OF THE PREFERRED EMBODIMENTS

Figure 1:
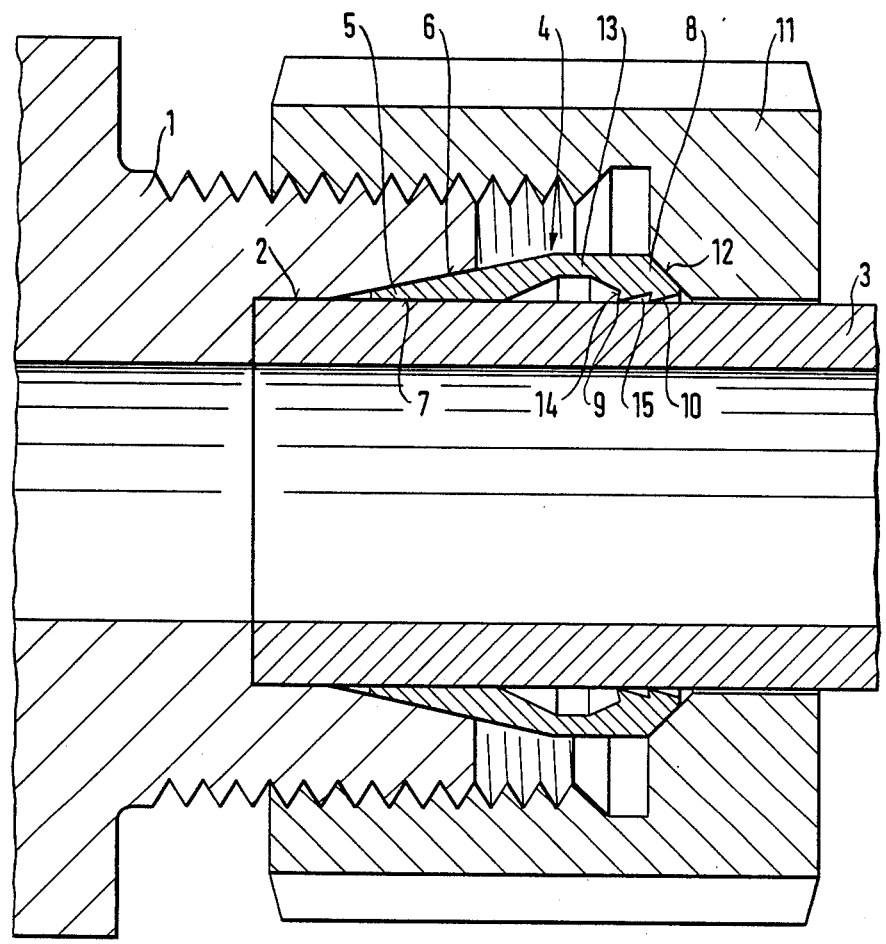
FIG. 1 is a section of an embodiment of the pipe adapter of the invention at the beginning of assembly.

Essentially the pipe adapter consists of an insertion stub 1 with an opening 2 conically flaring outward receiving the pipe end 3 which must be connected. A sealing bush 4 is slipped on the pipe end 3 and comprises a conically tapering outer surface 6 at its end 5, hereafter called the press end, facing the conical opening 2 of the insertion stub 1. The cone angle of the outside surface 6 essentially corresponds to the cone angle of the opening 2 of the insertion stub 1.

The inside surface 7 of the sealing bush 4 extends in the area of the press end 5 at least over part of the conical outer surface and is cylindrical. The inside diameter of the cylindrical surface is slightly larger than the outside diameter of the pipe end 3 to be connected.

At its end 8 away from the insertion stub 1 and hereafter called the cutting end, the sealing bush 4 is provided with two cutting edges 9, 10 directed toward the surface of the pipe end 3.

A clamping ring 11 is slipped on the pipe end 3 togther with the sealing bush 4 and illustratively is threaded on its inside and is screwed thereby on a corresponding outer thread on the insertion stub 1. The end face 12 of the sealing bush 4 facing the clamping ring 11 is made to be conically tapering and rests against a matching surface of the clamping ring 11, both conical surfaces having essentialy the same cone angle. The cone angle of the end face 12 is larger than the cone angle of the conical outer surrface 6 of the press end 5.

The segment 13 of the sealing bush 4 between the press end 5 and the cutting end 8 evinces a lesser wall thickness than the adjoining areas, the inside surface of the sealing bush between the ends of the cylindrical surface 7 and the cutting edge 9 evincing a somewhat outwardly arcuate shape when seen in cross-section. This arcuate contour depending on manufacture may be continuously curved or, as shown in the drawing, may be formed of two conically flaring surfaces merging into a cylindrical center surface. The apex area of this contour appropriately is such that its distance to the adjoining press end 5 exceeds that to the adjoining cutting edge 9.

The cutting edges 9 and 10 each have a cutting surface 14 slanting toward the press end 5 and subtending an angle between 15° and 25°, preferably less than 20°, with the plane of the diameter. The free surface 15 sloping toward the other end of the sealing bush subtends an angle from 12° to 20°, preferably 15° with the longitudinal axis of the sealing bush 4.

Figure 2:
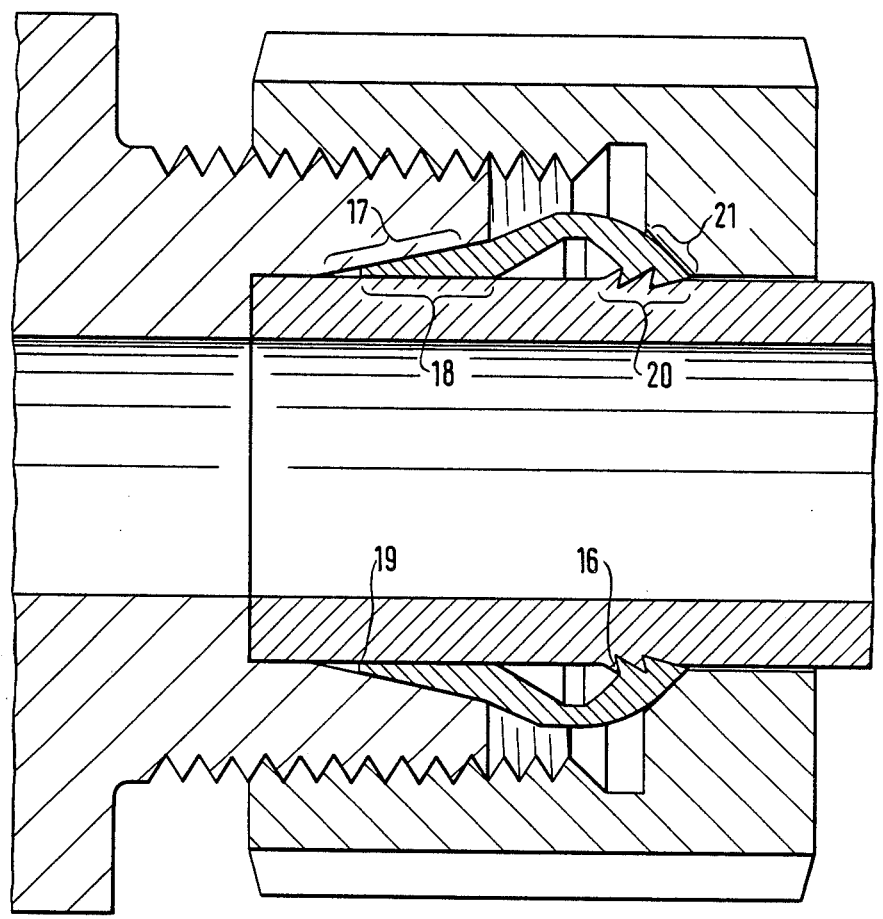
FIG. 2 shows the pipe adapter of FIG. 1 in the final, assembled state.

If now the clamping ring 11 is screwed on the insertion stub 1 using sufficient force, initially the press end 5 is forced into the conical widening of the opening 2, practically without any deformation of the segment 13. Because the cone angle of the press end 5 is only 24°, whereas the cone angle of the end face 12 is 90°, the press end 5 is compressed radially with substantial force, whereby the cylindrical surface 7, which is only slightly larger, is pressed on the outer surface of the pipe end 3. Only as the clamping ring 11 is screwed on further and when reaching a specific compression is exceeded will the segment 13 be deformed, as shown in FIG. 2, and the cutting edges 9, 10 then are being pressed into the material of the pipe 3. In the process, a cutting bead 16 is raised by the edge 9, resting in sealing manner on the cutting surface 14, while the cutting edge 10 raises a bead which is forced into the annular space between the cutting edge 9 and the cutting edge 10. Because the deformation of the segment 13 takes place within the elastic range of the sealing bush 4, this segment acts like an axial spring resting against the clamping ring 11 and pushing the press end 5 into the conical opening 2 of the insertion stub 1. The sealing between the insertion stub and the sealing bush on the one hand and on the other between the pipe outer surface and the sealing bush takes place, herein over the large area 17 and 18 resp. and solely by the compression. When the front edge 19 of the sealing bush 4 facing the pipe outer surface is rounded off, then this edge never shall cut into the pipe material. As a result, the two possible leakage paths are effectively sealed by the areas 17 and 18. For the design shown and when the materials are properly selected, no stress-crack corrosion can take place, in spite of the high force of sealing, on account of the slight compression and the undamaged surface, whereby permanent sealing is assured.

The area 20 spanned by the two cutting edges 9, 10 and the area 21 defined by the end face 12 of the sealing bush 4 moreover form a secondary or emergency seal for the two above stated leakage paths of this pipe adapter.

Figure 3:
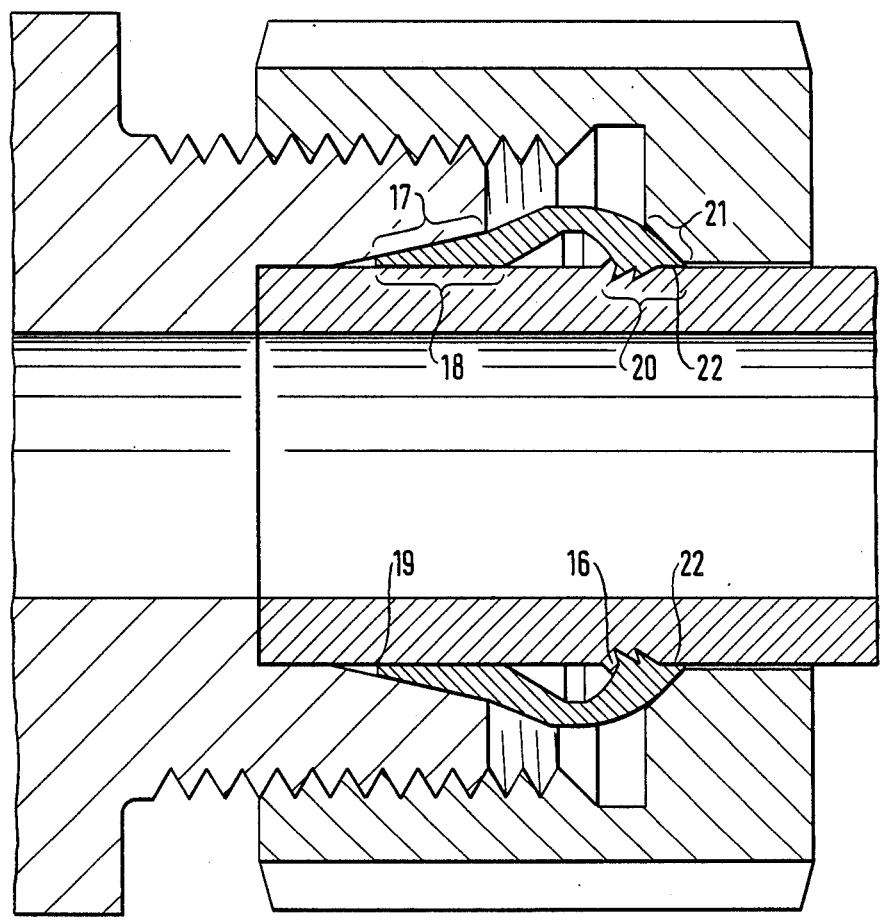
FIG. 3 is a section similar to FIG. 1 for a variation in the embodiments of FIG. 1.
Figure 4:
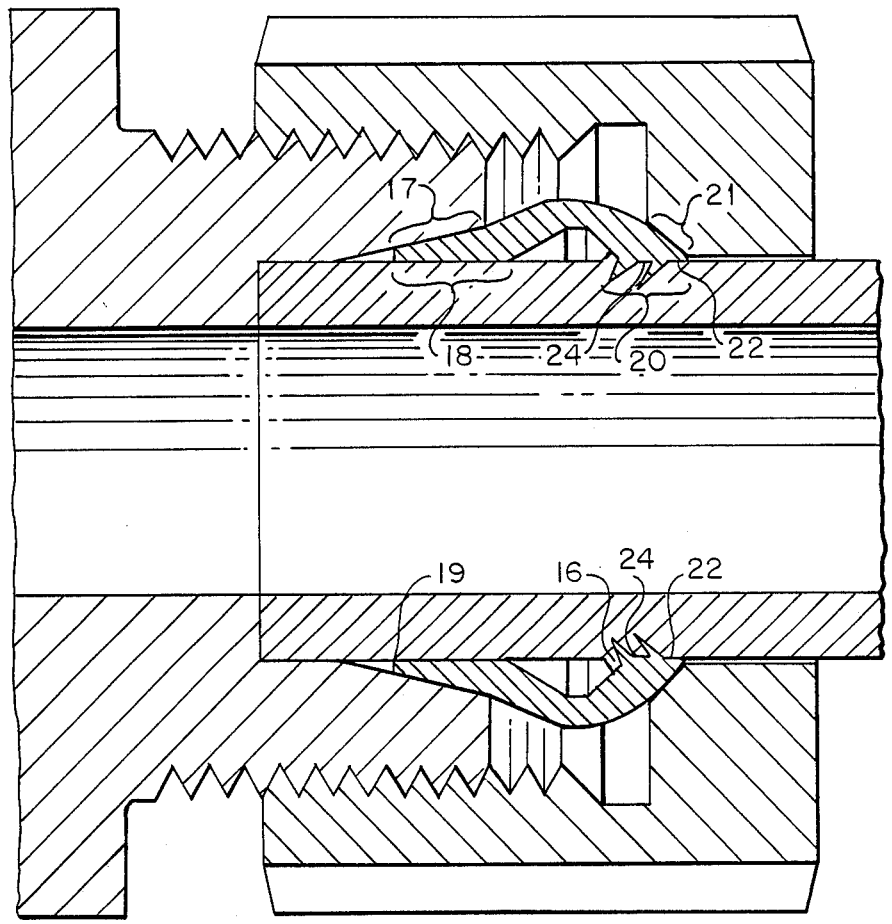
FIG. 4 is a section similar to FIG. 1 showing two stop surfaces.

To prevent damage to the connection, at least one stop surface 22 can be provided, as shown by FIG. 3, on the inside of the cutting end 8 next to, or between the cutting edges 9, 10. These stop surfaces 22, 24 also can be located on both sides next to the cutting edges 9, 10.

Such pipe adapters are employed especially in test and control conduits for methane pipelines with an outside diameter between 6 and 42 mm. The pipe adapter must be designed in such an application to withstand high pressures up to 650 bars and furthermore operational temperatures up to 150° C. in spite of the substantial thermal expansions occurring thereby and they must nevertheless remain tight at such installation temperatures. It is precisely acid gases containing $H_2S$ which at the stated pressures and temperatures are exceedingly reactive toward the water content in the gas and thereby are corrosive on the pipe and adapter materials.

Figure 5:
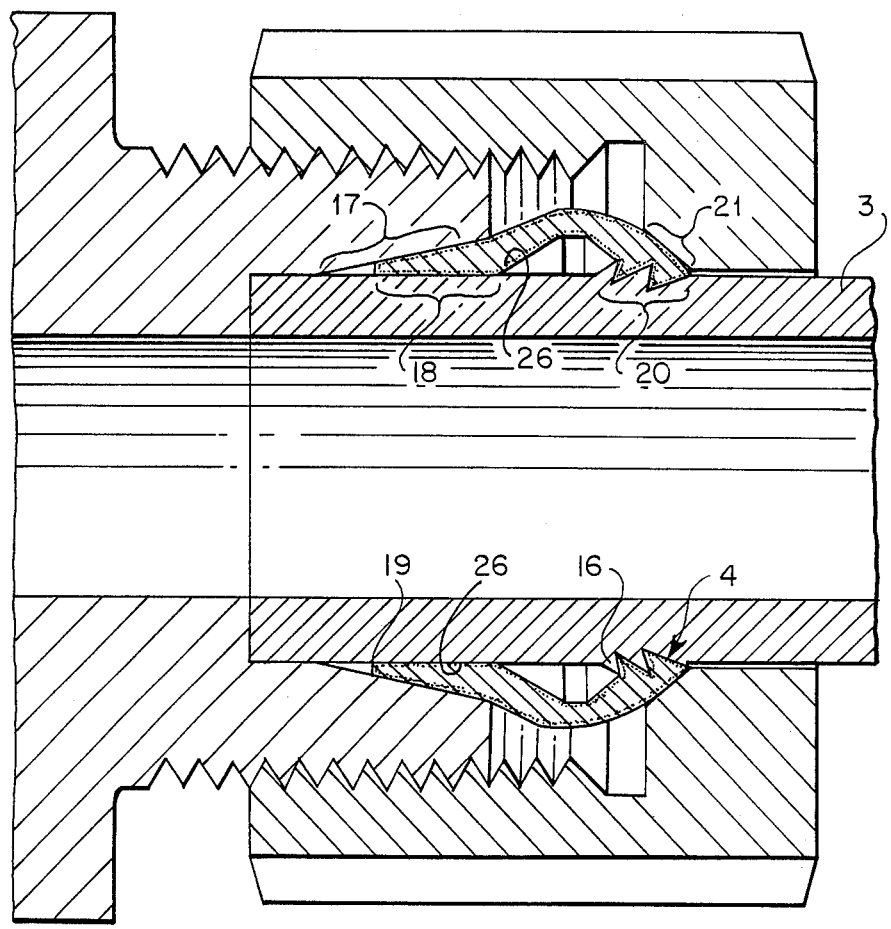
FIG. 5 shows the pipe adapter of FIG. 2 with a titanium-nitride coating.

As shown in FIG. 5, a titanium-nitride surface coating 26 is applied to the surfaces of bushing 4.

We claim:

1. In a pipe adapter having an insertion stub for a pipe end to be connected, said stub comprising a first inner cone, a sealing bushing slipped on said pipe end and having a first outer cone at a first end, said first inner cone seating said first outer cone and being correspondingly shaped, said sealing bushing having a second end comprising a second outer cone spanned by a correspondingly shaped second inner cone of a clamping ring and at least one cutting edge on an inside surface of said sealing bushing directed toward an outer wall of said pipe end in circumferential manner, whereas an inside surface of said first outer cone is cylindrical, said second end having a cone angle larger than that of said first end, the improvement comprising: said second end having a cone angle of 70° to 140° and a segment (13) of said sealing bushing between said first end and said second end having a lesser wall thickness than the adjacent segments and defining an axially acting spring, said sealing bushing being unitary.

2. The pipe adapter of claim 1, wherein said second end has a cone angle of about 90°.

3. The pipe adapter of claim 2, wherein said first end has a cone angle of about 24°.

4. The pipe adapter of claim 3, wherein at least one stop surface (22) is present next to said cutting edge on said inside surface of said surface (8).

5. The pipe adapter of claim 4, wherein there are a plurality of cutting edges and stop surfaces provided on each side next to said cutting edges (9,10).

6. The pipe adapter of claim 5, wherein an edge (19) of said first end (5) facing an outer pipe surface is rounded off.

7. The pipe adapter of claim 6, wherein said first end has a length of a cylindrical inside surface (7) of about ⅔ the length of said first inner cone.

8. The pipe adapter of claim 7, wherein said pipe end has a given outside diameter and said cylindrical inside surface is about 0.4% larger than said given outside diameter.

9. The pipe adapter of claim 8, wherein said cutting edges (9,10) are provided with cutting surfaces (14) slanting toward said first end (5) and subtending an angle between 15° and 25° with a plane of a diameter of said sealing bushing and further comprises a free surface (15) slanting toward said second end and subtending an angle between 12° and 20°, with a longitudinal axis of said sealing bushing (4).

10. The pipe adapter of claim 9, wherein said cutting surfaces subtend an angle of 20° and said free surface subtends an angle of 15°.

11. The pipe adapter of claim 10, wherein said second end has an inside diameter which is larger by about 1.6% than said given outside diameter.

12. The pipe adapter of claim 11, wherein said sealing bushing has an inside surface assuming an outwardly approximately arcuate contour when seen in longitudinal section of said segment (13) between first end (5) and said second end (9).

13. The pipe adapter of claim 12, wherein said inside surface of said sealing bushing has an apex closer to said second end than said first end.

14. The pipe adapter of claim 13, wherein said sealing bushing is made of an austenitic high-grade steel harder than the material of said pipe.

15. The pipe adapter of claim 14, wherein said sealing bushing (4) is provided with a titanium-nitride coating.

* * * * *